US012612871B2

(12) United States Patent
Huang et al.

(10) Patent No.: US 12,612,871 B2
(45) Date of Patent: Apr. 28, 2026

(54) ELECTRICALLY-ASSISTED TURBOCHARGER

(71) Applicant: Jiangsu Easyland Automotive Corporation, Wuxi (CN)

(72) Inventors: Jianjun Huang, Wuxi (CN); Quan Liu, Wuxi (CN); Yangli Sun, Wuxi (CN); Shuailong Shen, Wuxi (CN)

(73) Assignee: Jiangsu Easyland Automotive Corporation, Wuxi (CN)

( * ) Notice: Subject to any disclaimer, the term of this patent is extended or adjusted under 35 U.S.C. 154(b) by 0 days.

(21) Appl. No.: 19/208,798

(22) Filed: May 15, 2025

(65) Prior Publication Data

US 2025/0270974 A1 Aug. 28, 2025

Related U.S. Application Data

(63) Continuation of application No. PCT/CN2024/086591, filed on Apr. 8, 2024.

(30) Foreign Application Priority Data

May 30, 2023 (CN) ......................... 202310621460.5

(51) Int. Cl.

| | |
|---|---|
| ***F02B 37/10*** | (2006.01) |
| ***F02B 39/10*** | (2006.01) |
| ***F02M 35/02*** | (2006.01) |
| ***F02M 35/04*** | (2006.01) |

(52) U.S. Cl.
CPC .............. *F02B 37/10* (2013.01); *F02B 39/10* (2013.01); *F02M 35/0209* (2013.01); *F02M 35/046* (2013.01)

(58) Field of Classification Search
CPC ....... F02B 37/10; F02B 39/10; F02M 35/046; F02M 35/0209
See application file for complete search history.

(56) References Cited

FOREIGN PATENT DOCUMENTS

DE 202018000859 U1 * 2/2018 ............ B60L 3/0061

* cited by examiner

*Primary Examiner* — Ngoc T Nguyen
(74) *Attorney, Agent, or Firm* — Hemisphere Law, PLLC

(57) ABSTRACT

An electrically-assisted turbocharger includes an electrically-assisted turbocharger body. A side of the electrically-assisted turbocharger body is connected to a docking pipe, a side of the docking pipe is connected to a sealing cover, a bottom of the sealing cover is fixed with a purification pipe, two ends of the purification pipe are closed, a side of the purification pipe is connected to an air intake pipe, and an inside of the purification pipe is provided with an intermittent driving element. Multiple through-holes penetrating into an inside of the sealing cover are equidistantly defined on a top surface of the inside of the purification pipe, and a filtering assembly is slidably connected to an inside of each of the multiple through-holes. The electrically-assisted turbocharger solves a problem of dust accumulation on a filter element affecting its permeability in a turbocharger in the related art.

5 Claims, 3 Drawing Sheets

ELECTRICALLY-ASSISTED TURBOCHARGER

CROSS-REFERENCE TO RELATED APPLICATION

This application is a continuation of International Patent Application No. PCT/CN2024/086591, filed Apr. 8, 2024, which claims the priority of Chinese Patent Application No. 202310621460.5, filed May 30, 2023, both of which are herein incorporated by reference in their entirety.

TECHNICAL FIELD

The disclosure relates to the technical field of turbochargers, and more particularly to an electrically-assisted turbocharger.

BACKGROUND

A turbocharger is actually an air compressor that increases an air intake volume by compressing air. It uses the inertial force of exhaust gases emitted by an engine to drive a turbine in a turbine chamber, which in turn drives a coaxial impeller. The impeller compresses air sent through an air filter pipe, increasing air pressure and directing the air into a cylinder. When the engine speed increases, the exhaust gas discharge speed and turbine speed also increase synchronously, allowing the impeller to compress more air into the cylinders. The increased air pressure and air density enable more fuel to be burned, thereby enhancing engine power output through correspondingly increasing fuel quantity and adjusting engine speed. At present, in order to improve the working efficiency of the turbocharger, electrical equipment is usually used to assist in transmitting power. Electrical power components need to be lubricated with lubricating oil during actual use to ensure smooth operation of internal components. Therefore, the air flowing inside the turbocharger needs to be cleaner. However, the turbocharger in the related art usually only uses a filter element to filter the air. With prolonged use of the filter element, dust will adhere to the filter element and affect its permeability. At the same time, using the filter element for filtration cannot clean the filter element during operation, which is not convenient for people to use.

SUMMARY

A purpose of the disclosure is to provide an electrically-assisted turbocharger, which solve a problem that a turbocharger in the related art usually only uses a filter element to filter air. With prolonged use of the filter element, dust will adhere to the filter element and affect its permeability. At the same time, using the filter element for filtration cannot clean the filter element during operation, which is not convenient for people to use.

To achieve the above purpose, the disclosure provides the following technical solution: an electrically-assisted turbocharger, including an electrically-assisted turbocharger body. A side of the electrically-assisted turbocharger body is connected to a docking pipe, a side of the docking pipe is connected to a sealing cover, a bottom of the sealing cover is fixed with a purification pipe, two ends of the purification pipe are closed, a side of the purification pipe is connected to an air intake pipe, and an inside of the purification pipe is provided with an intermittent driving element; multiple through-holes penetrating into an inside of the sealing cover are equidistantly defined on a top surface of the inside of the purification pipe, and a filtering assembly is slidably connected to an inside of each of the multiple through-holes; a bottom surface of the inside of the purification pipe defines a dust collection groove, a discharge device is disposed on an inside of the dust collection groove, a side of the dust collection groove penetrates through an outside of the purification pipe, an outer surface of the air intake pipe is fixed with a mounting plate, and a bottom of the mounting plate is fixed with a motor;

the intermittent driving element includes a rotating shaft, an outer surface of the rotating shaft is equidistantly fixed with multiple discs, a side of each of the multiple discs defines a V-shaped groove, and two sides of each of the multiple discs are fixed with two scrapers respectively; and an end of the rotating shaft is rotatably connected to an inner wall of another side of the purification pipe, and another end of the rotating shaft extends to the outside of the purification pipe and is connected to an output end of the motor;

the filtering assembly includes a fixed plate, a bottom of the fixed plate is equidistantly fixed with multiple guide rods along a circumferential direction of the fixed plate, bottoms of the multiple guide rods are fixed to a top of the purification pipe, outer surfaces of the multiple guide rods are slidably connected to a movable ring, and a bottom of the movable ring is fixed with a fixed pipe;

a middle part of an outer surface of the fixed pipe equidistantly defines multiple penetration openings along a circumferential direction of the fixed pipe, the outer surface of the fixed pipe is fitted with a filter cloth, a bottom of the fixed pipe is closed, and sealing rings are fixed close to top and bottom edges of the outer surface of the fixed pipe; and an inner wall of each of the multiple through-holes close to a bottom edge thereof defines multiple mounting grooves, an annular cleaning brush is disposed in an inside of each of the multiple mounting grooves, and inner bristles of the annular cleaning brush extend to an outer surface of the filter cloth; and a spring is fixed between a top of the movable ring and the bottom of the fixed plate, the bottom of the fixed pipe is fixed with a fixed block, and a bottom of the fixed block is rotatably connected to a rolling ball.

In an embodiment, each of the multiple discs is located directly below a corresponding through-hole of the multiple through-holes, the V-shaped grooves on two adjacent discs of the multiple discs form a 90-degree angle with each other along an axial direction of the rotating shaft, and the two scrapers on each of the multiple discs form 90-degree angles with the V-shaped groove on each of the multiple discs along the axial direction of the rotating shaft.

In an embodiment, an outer surface of each of the multiple discs is in contact with an inner wall of the purification pipe, and sides of the two scrapers on each of the multiple discs obliquely extend to the outer surface of each of the multiple discs and are in contact with the inner wall of the purification pipe.

In an embodiment, the discharge device includes a connecting rod, an end of the connecting rod is rotatably connected to an inner wall of another side of the dust collection groove, and another end of the connecting rod extends to the outside of the purification pipe, a belt is connected between the another end of the connecting rod and the another end of the rotating shaft, and an outer surface of the connecting rod is fixed with helical blades.

In an embodiment, a spring hinge is disposed on an inner wall of the side of the dust collection groove close to a top edge of the dust collection groove, an outer surface of the spring hinge is rotatably connected to a movable plate, a side of the movable plate extends to a top of another side of the dust collection groove, a top of the movable plate is in contact with an inner wall of the purification pipe, multiple guide blocks are equidistantly arranged on the top of the movable plate, and each of the multiple guide blocks is aligned with a corresponding scraper.

Compared to the related art, the disclosure can achieve the following beneficial effects.

1. When the electrically-assisted turbocharger is in use, the intermittent driving element drives the multiple filtering assemblies to work alternately. This allows dust on the multiple filtering assemblies to be filtered out during an entire operation of the electrically-assisted turbocharger, making the air cleaner. In addition, the V-shaped grooves are respectively provided on the discs of the intermittent driving element to facilitate the lifting of the multiple filtering assemblies.

2. In actual use, each of the multiple filtering assemblies tends to slide into the purification pipe under the elastic pressure of the spring. Under the guidance of the outer surface of each of the discs and the rolling ball, when the rolling ball does not roll into the V-shaped groove, each of the multiple filtering assemblies will not enter the purification pipe for air filtration. In addition, the two scrapers are provided on each of the discs to collect dust brushed off from the filtering assembly by the annular cleaning brushes.

3. When bottoms of the two scrapers slide to the top of the movable plate, they are in contact with corresponding guide blocks, thereby pressing the side of the movable plate into the inside of the dust collection groove. This allows the dust scraped off by the two scrapers to flow along the movable plate into the inside of the dust collection groove. In addition, the connecting rod drives the helical blades to rotate, which can discharge the dust inside the dust collection groove to the outside.

DESCRIPTION OF REFERENCE SIGNS IN THE DRAWINGS

1. electrically-assisted turbocharger body; 2. purification pipe; 3. docking pipe; 4. sealing cover; 5. air intake pipe; 6. mounting plate; 7. motor; 8. dust collection groove; 9. rotating shaft; 10. belt; 11. disc; 12. V-shaped groove; 13. scraper; 14. movable plate; 15. guide block; 16. helical blade; 17. connecting rod; 18. guide rod; 19. fixed plate; 20. spring; 21. movable ring; 22. mounting groove; 23. annular cleaning brush; 24. through-hole; 25. fixed pipe; 26. filter cloth; 27. penetration opening; 28. sealing ring; 29. fixed block; 30. rolling ball; 31. spring hinge.

DETAILED DESCRIPTION OF EMBODIMENTS

The following is a clear and complete description of technical solutions of the disclosure with reference to attached drawings of embodiments of the disclosure. It should be understood that the described embodiments are merely a part of the embodiments of the disclosure, rather than all of the embodiments. Any other embodiments obtained by those skilled in the art without making inventive efforts based on the embodiments of the disclosure are within the scope of protection of the disclosure.

Figure 1:
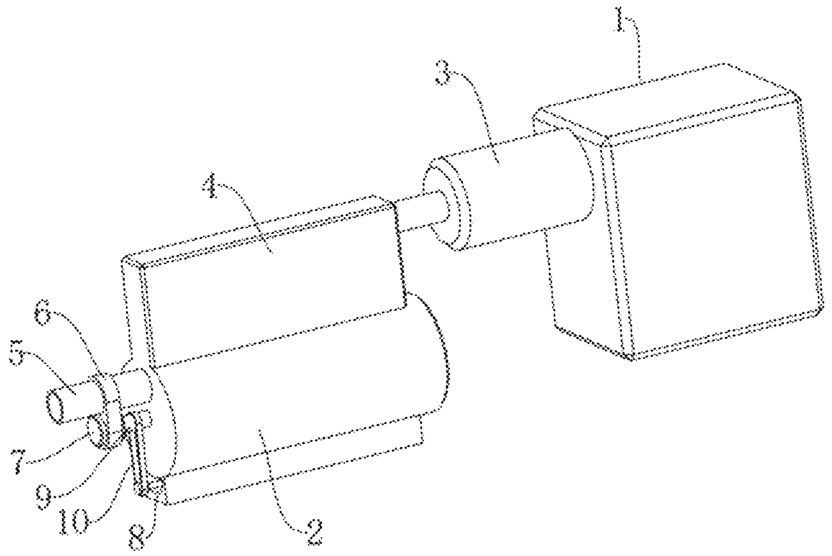
FIG. 1 illustrates a front perspective view of an electrically-assisted turbocharger provided by the disclosure.
Figure 2:
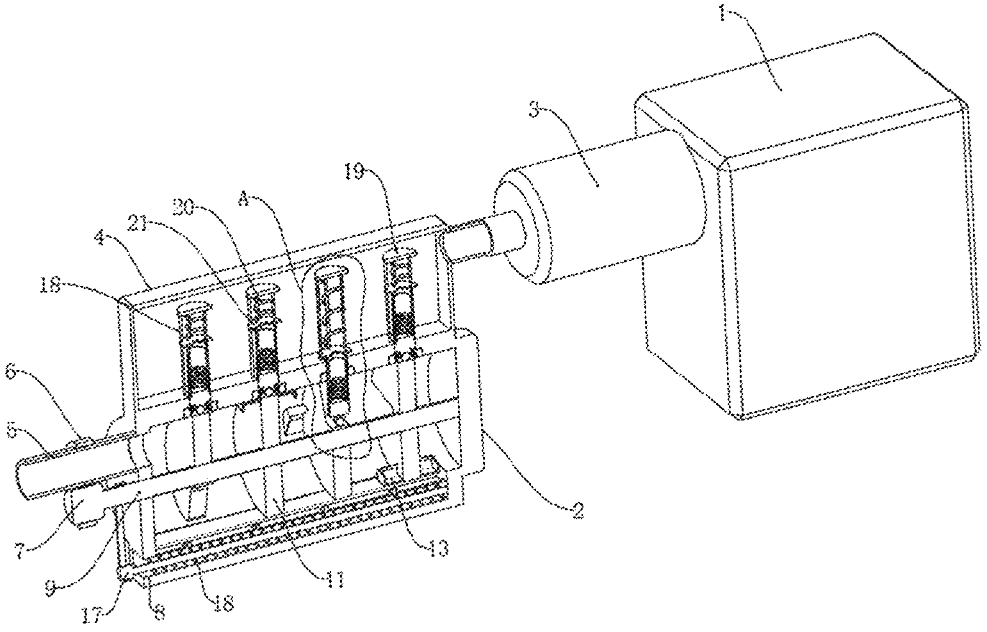
FIG. 2 illustrates a sectional perspective view of a side of the electrically-assisted turbocharger provided by the disclosure.
Figure 3:
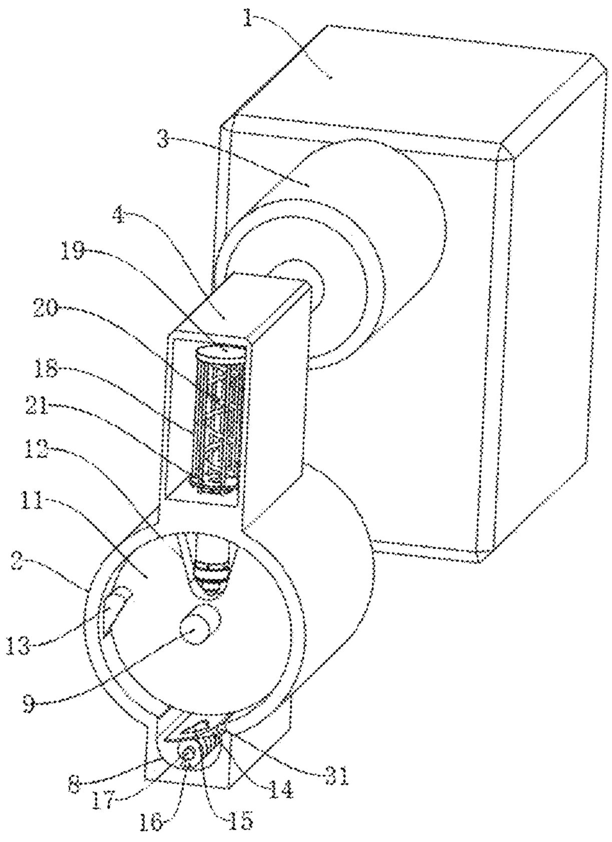
FIG. 3 illustrates a sectional perspective view of another side of the electrically-assisted turbocharger provided by the disclosure.
Figure 4:
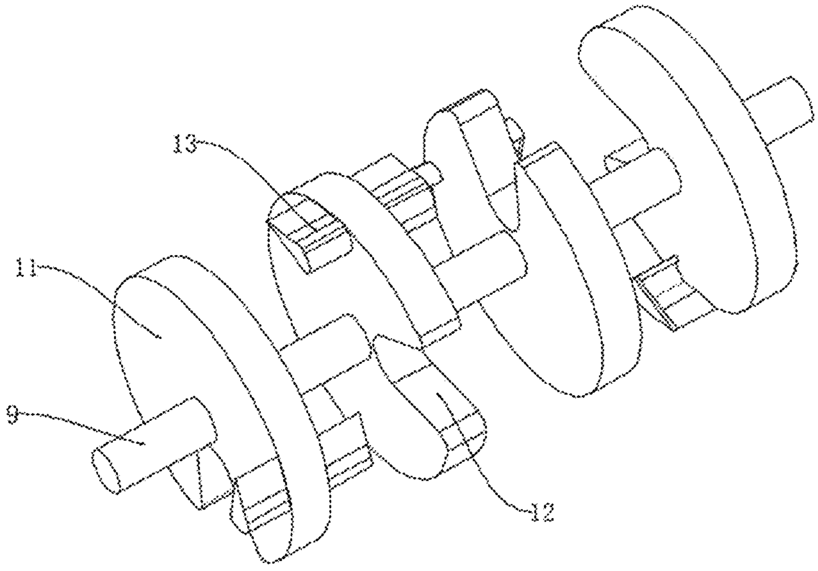
FIG. 4 illustrates a front perspective view of an intermittent driving element of the electrically-assisted turbocharger provided by the disclosure.
Figure 5:
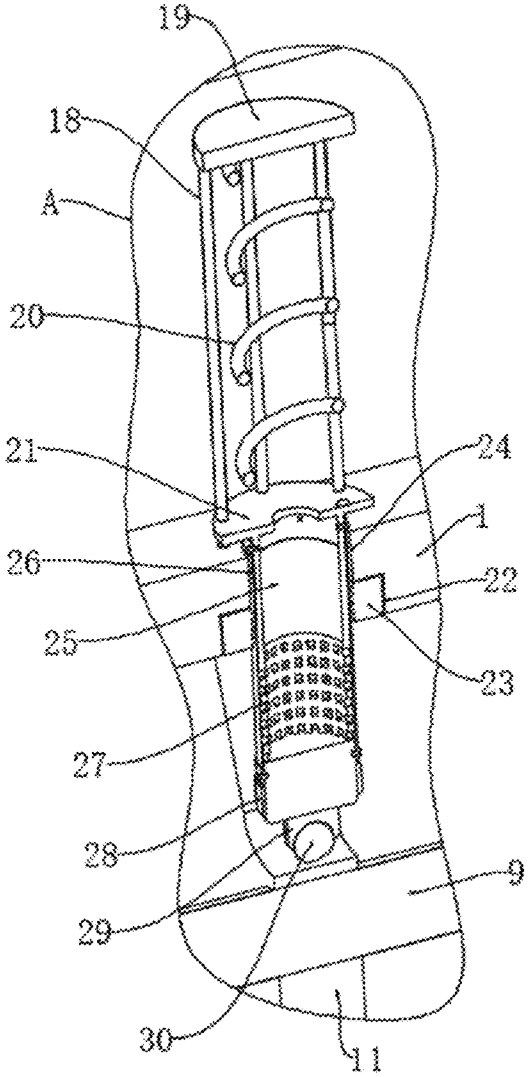
FIG. 5 illustrates an enlarged view of region A in the electrically-assisted turbocharger shown in FIG. 2 provided by the disclosure.

Referring to FIGS. 1-5, an embodiment of the disclosure provides a technical solution: an electrically-assisted turbocharger. The electrically-assisted turbocharger includes an electrically-assisted turbocharger body 1. A side of the electrically-assisted turbocharger body 1 is connected to a docking pipe 3. A side of the docking pipe 3 is connected to a sealing cover 4. A bottom of the sealing cover 4 is fixed with a purification pipe 2. Two ends of the purification pipe 2 are closed, and a side of the purification pipe 2 is connected to an air intake pipe 5. An inside of the purification pipe 2 is provided with an intermittent driving element. Multiple through-holes 24 penetrating into an inside of the sealing cover 4 are equidistantly defined on a top surface of the inside of the purification pipe 2. A filtering assembly is slidably connected to an inside of each of the multiple through-holes 24. A bottom surface of the inside of the purification pipe 2 defines a dust collection groove 8. A discharge device is disposed on an inside of the dust collection groove 8. A side of the dust collection groove 8 penetrates to an outside of the purification pipe 2. An outer surface of the air intake pipe 5 is fixed with a mounting plate 6, and a bottom of the mounting plate 6 is fixed with a motor 7. The intermittent driving element includes a rotating shaft 9. An outer surface of the rotating shaft 9 is equidistantly fixed with multiple discs 11. A side of each of the multiple discs 11 defines a V-shaped groove 12. Two sides of each of the multiple discs 11 are fixed with two scrapers 13 respectively. An end of the rotating shaft 9 is rotatably connected to an inner wall of another side of the purification pipe 2. Another end of the rotating shaft 9 extends to the outside of the purification pipe 2 and is connected to an output end of the motor 7.

The disclosure can achieve the following effects. When the electrically-assisted turbocharger is in use, external air is first introduced into the inside of the purification pipe 2 through the air intake pipe 5. The intermittent driving element is used in the inside of the purification pipe 2 to drive the multiple filtering assemblies to work alternately, thus dust on the multiple filtering assemblies can be filtered during an entire operation of the electrically-assisted turbocharger, making the air cleaner. When the intermittent driving element works, it drives the rotating shaft 9 to rotate by activating the motor 7, thereby driving the multiple discs 11 to rotate. When the multiple discs 11 rotate, they guide the multiple filtering assemblies to work intermittently and alternately under directions of the V-shaped grooves 12. The two scrapers 13 are mounted on each of the multiple discs 11, and when each of the multiple discs 11 rotates, dust filtered on an outer surface of a filter cloth 26 can be brushed off by annular cleaning brushes 23. Simultaneously, when each of the multiple discs 11 rotates, it drives the two scrapers 13 to collect dust that falls into the inside of the purification pipe 2.

Referring to FIGS. 2-5, each of the multiple discs 11 is located directly below a corresponding through-hole 24 of the multiple through-holes 24. The V-shaped grooves 12 on two adjacent discs 11 of the multiple discs 11 form a 90-degree angle with each other along an axial direction of the rotating shaft 9. The two scrapers 13 on each of the multiple discs 11 form 90-degree angles with the V-shaped groove 12 on each of the multiple discs 11 along the axial direction of the rotating shaft 9. An outer surface of each of the multiple discs 11 is in contact with an inner wall of the purification pipe 2. Sides of the two scrapers 13 on each of the multiple discs 11 obliquely extend to the outer surface of each of the multiple discs 11 and are in contact with the inner wall of the purification pipe 2. The discharge device includes a connecting rod 17. An end of the connecting rod 17 is rotatably connected to an inner wall of another side of the dust collection groove 8, and another end of the connecting rod 17 extends to the outside of the purification pipe 2. A belt 10 is connected between the another end of the connecting rod 17 and the another end of the rotating shaft 9. An outer surface of the connecting rod 17 is fixed with helical blades 16. A spring hinge 31 is disposed on an inner wall of the side of the dust collection groove 8 close to a top edge of the dust collection groove 8, and an outer surface of the spring hinge 31 is rotatably connected to a movable plate 14. A side of the movable plate 14 extends to a top of the another side of the dust collection groove 8. A top of the movable plate 14 is in contact with the inner wall of the purification pipe 2. Multiple guide blocks 15 are equidistantly arranged on the top of the movable plate 14, and each of the multiple guide blocks 15 is aligned with a corresponding scraper 13.

The disclosure can achieve the following effects. In actual use, a number of the discs 11 is four. The V-shaped grooves 12 on the two adjacent discs 11 of the discs 11 form the 90-degree angle with each other along the axial direction of the rotating shaft 9. This allows each of the multiple filtering assemblies to expand and contract once when the rotating shaft 9 rotates one revolution, which means that four dust removal operations are carried out when the rotating shaft 9 rotates once, greatly improving the quality of air purification. The two scrapers 13 on each of the discs 11 form the 90-degree angles with the V-shaped groove 12 on each of the discs 11 along the axial direction of the rotating shaft 9. This ensures that when each of the disc 11 rotates, the dust brushed off from each of the multiple filtering assemblies by the annular cleaning brushes is promptly scraped off by the two scrapers 13 after a 90-degree rotation. This prevents the dust removed by a multiple filtering assembly from being blown back into the airflow and affecting the operation of another filtering assembly. When the two scrapers 13 slide above the movable plate 14, the bottoms of the two scrapers 13 are in contact with the tops of the guide blocks 15 respectively, pressing the side of the movable plate 14 into the dust collection groove 8, creating a gap between the dust collection groove 8 and the purification pipe 2. The dust scraped off by the two scrapers 13 then flows into the dust collection groove 8 along the movable plate 14. Inside the dust collection groove 8, the internal dust is expelled by rotating the helical blades 16.

Referring to FIGS. 2-5, the filtering assembly includes a fixed plate 19. A bottom of the fixed plate 19 is equidistantly fixed with multiple guide rods 19 along a circumferential direction of the fixed plate 19. Bottoms of the multiple guide rods 19 are fixed to a top of the purification pipe 2, and outer surfaces of the multiple guide rods 18 are slidably connected to a movable ring 21. A bottom of the movable ring 21 is fixed with a fixed pipe 25. A middle part of an outer surface of the fixed pipe 25 equidistantly defines multiple penetration openings 27 along a circumferential direction of the fixed pipe 25. The outer surface of the fixed pipe 25 is fitted with the filter cloth 26. A bottom of the fixed pipe 25 is closed, and sealing rings 28 are fixed close to top and bottom edges of the outer surface of the fixed pipe 25. An inner wall of each of the multiple through-holes 24 close to a bottom edge thereof defines multiple mounting grooves 22. An annular cleaning brush 23 is disposed in an inside of each of the multiple mounting grooves 22, and inner bristles of the annular cleaning brush 23 extend to an outer surface of the filter cloth 26. A spring 20 is fixed between a top of the movable ring 21 and the bottom of the fixed plate 19. The bottom of the fixed pipe 25 is fixed with a fixed block 29, and a bottom of the fixed block 29 is rotatably connected to a rolling ball 30. A depth of the V-shaped groove 12 can be set as needed to allow the rolling ball 30 to smoothly enter and exit the V-shaped groove 12.

The disclosure can achieve the following effects. When the multiple filtering assemblies work alternately driven by the intermittent driving element, the rolling ball 30 continuously rolls along the outer surface of each of the discs 11. When the rolling ball 30 enters the V-shaped groove 12, the movable ring 21 is pushed to slide along the multiple guide rods 18 under the elastic force of the spring 20, thereby pushing the fixed pipe 25 and the filter cloth 26 to the inside of the purification pipe 2. The air inside the purification pipe 2 is filtered through the filter cloth 26 and then flows from the inside of the fixed pipe 25 into the inside of the sealing cover 4, and finally enters the electrically-assisted turbocharger body 1 through the docking pipe 3. When the rolling ball 30 rolls out of the V-shaped groove 12, the rolling ball 30 compresses the spring 20 upward, causing the fixed pipe 25 and the filter cloth 26 to slide outward. During this sliding process, the annular cleaning brushes 23 can brush off the dust on the outer surface of the filter cloth 26. When the fixed pipe 25 slides to a position close to a bottom of a through-hole 24, the sealing ring 28 seals the through-hole 24 to prevent unfiltered air from overflowing into the inside of the sealing cover 4 through a connection between the through-hole 24 and the sealing ring 28.

A usage method and working principle of the electrically-assisted turbocharger are as follows. First, the external air is introduced into the inside of the purification pipe 2 through the intake pipe 5. The motor 7 is activated to drive the rotating shaft 9 to rotate, which in turn drives the multiple discs 11 to rotate. When the multiple discs 11 rotate, the multiple filtering assemblies work intermittently and alternately under the guidance of the V-shaped grooves 12. When each of the filtering assemblies is working, the rolling ball 30 continuously rolls along the outer surface of each of the multiple discs 11. When the rolling ball 30 enters the V-shaped groove 12, the movable ring 21 is pushed to slide along the multiple guide rods 18 under the elastic force of the spring 20, thereby pushing the fixed pipe 25 and the filter cloth 26 to the inside of the purification pipe 2. The air inside the purification pipe 2 is filtered through the filter cloth 26 and then flows from the inside of the fixed pipe 25 into the inside of the sealing cover 4, and finally enters the electrically-assisted turbocharger body 1 through the docking pipe 3. When the rolling ball 30 rolls out of the inside of the V-shaped groove 12, the rolling ball 30 compresses the spring 20 upward, causing the fixed pipe 25 and the filter cloth 26 to slide outward. During this sliding process, the annular cleaning brushes 23 can brush off the dust on the outer surface of the filter cloth 26. When the fixed pipe 25 slides to a position close to a bottom of a through-hole 24, the sealing ring 28 seals the through-hole 24 to prevent unfiltered air from overflowing into the inside of the sealing cover 4 through the connection between the through-hole 24 and the sealing ring 28. Simultaneously, when the disc 11 rotates, the two scrapers 13 collect the dust that falls into the purification pipe 2. When the two scrapers 13 slide to the top of the movable plate 14, the bottoms of the two scrapers 13 are in contact with the tops of the guide blocks 15 respectively, thereby pressing the side of the movable plate 14 into the inside of the dust collection groove 8, creating the gap between the dust collection groove 8 and the purification pipe 2. The dust scraped off by the two scrapers 13 then flows into the inside of the dust collection groove 8 along the movable plate 14. Inside the dust collection groove 8, the internal dust is expelled by rotating the helical blades 16.

In some embodiments, during actual operation, when the external air is introduced into the inside of the purification pipe 2 through the intake pipe 5, the motor 7 is activated to drive the rotating shaft 9 to rotate, thereby driving the multiple discs 11 to rotate. When the multiple discs 11 rotate, the multiple filtering assemblies are caused to work intermittently and alternately under the guidance of the V-shaped grooves 12.

When the filtering assembly extends into the inside of the purification pipe 2, the rolling ball 30 located below the fixed pipe 25 will roll within the V-shaped groove 12. Concurrently, the air inside the purification pipe 2, after being filtered through the filter cloth 26, will flow from the inside of the fixed pipe 25 into the inside of the sealing cover 4, and ultimately enter the electrically-assisted turbocharger body 1 through the docking pipe 3.

When the filtering assembly slides outward from the inside of the purification pipe 2, the annular cleaning brushes 23 scrape off the dust filtered and adhered to the outer surface of the filter cloth 26. Meanwhile, When the disc rotates, it drives the two scrapers 13 to collect the dust that falls inside the purification pipe 2. When the two scrapers 12 slide to the top of the movable plate 14, the bottoms of the two scrapers 12 are in contact with the tops of the guide blocks 15 respectively, thereby pressing the side of the movable plate 14 into the inside of the dust collection groove 8. This action opens the gap between the dust collection groove 8 and the purification pipe 2. The dust scraped off by the two scrapers 12 then flows into the inside of the dust collection groove 8 along the movable plate 14. Inside the dust collection groove 8, the internal dust is expelled by rotating the helical blades 16.

Although detailed descriptions of the disclosure have been provided with reference to the foregoing embodiments, it is understood that those skilled in the art can make modifications to or equivalent substitutions for specific technical features described in the embodiments without departing from the spirit and scope of the disclosure. Any and all such modifications or equivalent substitutions and improvements are intended to be included within the scope of the disclosure.

What is claimed is:

1. An electrically-assisted turbocharger, comprising an electrically-assisted turbocharger body (1), wherein a side of the electrically-assisted turbocharger body (1) is connected to a docking pipe (3), a side of the docking pipe (3) is connected to a sealing cover (4), a bottom of the sealing cover (4) is fixed with a purification pipe (2), two ends of the purification pipe (2) are closed, a side of the purification pipe (2) is connected to an air intake pipe (5), and an inside of the purification pipe (2) is provided with an intermittent driving element; a plurality of through-holes (24) penetrating into an inside of the sealing cover (4) are equidistantly defined on a top surface of the inside of the purification pipe (2), and a filtering assembly is slidably connected to an inside of each of the plurality of through-holes (24); a bottom surface of the inside of the purification pipe (2) defines a dust collection groove (8), a discharger device is disposed on an inside of the dust collection groove (8), a side of the dust collection groove (8) penetrates through an outside of the purification pipe (2), an outer surface of the air intake pipe (5) is fixed with a mounting plate (6), and a bottom of the mounting plate (6) is fixed with a motor (7);

wherein the intermittent driving element comprises a rotating shaft (9), an outer surface of the rotating shaft (9) is equidistantly fixed with a plurality of discs (11), a side of each of the plurality of discs (11) defines a V-shaped groove (12), and two sides of each of the plurality of discs (11) are fixed with two scrapers (13) respectively; and an end of the rotating shaft (9) is rotatably connected to an inner wall of another side of the purification pipe (2), and another end of the rotating shaft (9) extends to the outside of the purification pipe (2) and is connected to an output end of the motor (7);

wherein the filtering assembly comprises a fixed plate (19), a bottom of the fixed plate (19) is equidistantly fixed with a plurality of guide rods (18) along a circumferential direction of the fixed plate (19), bottoms of the plurality of guide rods (18) are fixed to a top of the purification pipe (2), outer surfaces of the plurality of guide rods (18) are slidably connected to a movable ring (21), and a bottom of the movable ring (21) is fixed with a fixed pipe (25);

wherein a middle part of an outer surface of the fixed pipe (25) equidistantly defines a plurality of penetration openings (27) along a circumferential direction of the fixed pipe (25), the outer surface of the fixed pipe (25) is fitted with a filter cloth (26), a bottom of the fixed pipe (25) is closed, and sealing rings (28) are fixed close to top and bottom edges of the outer surface of the fixed pipe (25); and wherein an inner wall of each of the plurality of through-holes (24) close to a bottom edge thereof defines a plurality of mounting grooves (22), an annular cleaning brush (23) is disposed in an inside of each of the plurality of mounting grooves (22), and inner bristles of the annular cleaning brush (23) extend to an outer surface of the filter cloth (26); and a spring (20) is fixed between a top of the movable ring (21) and the bottom of the fixed plate (19), the bottom of the fixed pipe (25) is fixed with a fixed block (29), and a bottom of the fixed block (29) is rotatably connected to a rolling ball (30).

2. The electrically-assisted turbocharger as claimed in claim 1, wherein each of the plurality of discs (11) is located directly below a corresponding through-hole (24) of the plurality of through-holes (24), the V-shaped grooves (12) on two adjacent discs (11) of the plurality of discs (11) form a 90-degree angle with each other along an axial direction of the rotating shaft (9), and the two scrapers (13) on each of the plurality of discs (11) form 90-degree angles with the V-shaped groove (12) on each of the plurality of discs (11) along the axial direction of the rotating shaft (9).

3. The electrically-assisted turbocharger as claimed in claim 1, wherein an outer surface of each of the plurality of discs (11) is in contact with an inner wall of the purification pipe (2), and sides of the two scrapers (13) on each of the plurality of discs (11) obliquely extend to the outer surface of each of the plurality of discs (11) and are in contact with the inner wall of the purification pipe (2).

4. The electrically-assisted turbocharger as claimed in claim 1, wherein the discharge device comprises a connecting rod (17), an end of the connecting rod (17) is rotatably connected to an inner wall of another side of the dust collection groove (8), and another end of the connecting rod (17) extends to the outside of the purification pipe (2), a belt (10) is connected between the another end of the connecting rod (17) and the another end of the rotating shaft (9), and an outer surface of the connecting rod (17) is fixedly with helical blades (16).

5. The electrically-assisted turbocharger as claimed in claim 1, wherein a spring hinge (31) is disposed on an inner wall of the side of the dust collection groove (8) close to a top edge of the dust collection groove (8), an outer surface of the spring hinge (31) is rotatably connected to a movable plate (14), a side of the movable plate (14) extends to a top of another side of the dust collection groove (8), a top of the movable plate (14) is in contact with an inner wall of the purification pipe (2), a plurality of guide blocks (15) are equidistantly arranged on the top of the movable plate (14), and each of the plurality of guide blocks (15) is aligned with a corresponding scraper (13).

* * * * *